(12) United States Patent
Lindahl

(10) Patent No.: US 6,629,467 B1
(45) Date of Patent: Oct. 7, 2003

(54) METHOD AND A DEVICE FOR DETERMINING THE FLOW RATE OF A FLOWING MEDIUM

(75) Inventor: Jörgen Lindahl, Skurup (SE)

(73) Assignee: Thermo Electron Corporation, Houston, TX (US)

( * ) Notice: Subject to any disclaimer, the term of this patent is extended or adjusted under 35 U.S.C. 154(b) by 0 days.

(21) Appl. No.: 09/743,488
(22) PCT Filed: Mar. 25, 1999
(86) PCT No.: PCT/SE99/00473
§ 371 (c)(1), (2), (4) Date: Mar. 22, 2001
(87) PCT Pub. No.: WO99/51945
PCT Pub. Date: Oct. 14, 1999

(30) Foreign Application Priority Data

Mar. 25, 1998 (SE) ................................ 9801014

(51) Int. Cl.⁷ ................................ G01F 1/66
(52) U.S. Cl. ................................ 73/861.29
(58) Field of Search ................ 73/861.27, 861.28, 73/861.29, 861.31

(56) References Cited

U.S. PATENT DOCUMENTS

| 5,440,936 A | * | 8/1995 | Spani et al. ............. 73/861.28 |
| 5,461,931 A | | 10/1995 | Gill ......................... 73/861.28 |
| 5,546,813 A | * | 8/1996 | Hastings et al. ......... 73/861.29 |
| 5,602,343 A | * | 2/1997 | Franklin .................. 73/861.29 |
| 5,796,009 A | * | 8/1998 | Delsing ................... 73/861.27 |
| 6,062,091 A | * | 5/2000 | Baumoel ................. 73/861.27 |

FOREIGN PATENT DOCUMENTS

| DE | 29 50 862 | 7/1981 |
| DE | 40 11 526 | 10/1991 |
| EP | 0 141 546 | 10/1984 |
| EP | 0 733 885 A1 | 9/1996 |
| WO | WO 88/08516 | 11/1988 |

* cited by examiner

Primary Examiner—Edward Lefkowitz
Assistant Examiner—Jewel V. Thompson
(74) Attorney, Agent, or Firm—Rosenthal & Osha L.L.P.

(57) ABSTRACT

In a method for determining the flow rate of a fluid flowing in a channel (2), the fluid being constituted by a liquid or a gas, two pulse shaped, oscillating signals are sent through the medium with one signal directed against (14) and the other signal directed with (12) the flow direction (4) of the fluid. The transmitted signals are received and the flow rate is determined by means of the phase shift between the received, pulse shaped signals caused by the flow of the fluid. The phase shift (20) between the signals is determined while compensating for the dwell time of the pulse shaped oscillating signals in the fluid.

20 Claims, 4 Drawing Sheets

METHOD AND A DEVICE FOR DETERMINING THE FLOW RATE OF A FLOWING MEDIUM

BACKGROUND OF THE INVENTION

1. Field of the Invention

The present invention relates to a method and a device for determining the flow rate of a fluid flowing in a channel, the fluid being constituted by a liquid or a gas.

2. Description of Related Art

It is previously known to determine the flow rate of a fluid flowing in a channel by sending two pulse shaped, oscillating signals through the fluid, one of the signals being directed against and the other signal being directed with the flow of the fluid, whereupon the signals are received and the flow rate is determined by means of the phase shift between the received, pulse shaped signals, caused by the fluid flow. The signal sent with the fluid flow will more rapidly reach the signal receiver than the signal sent against the fluid flow, and this provides for a phase shift between the two signals by means of which it is possible to determine the flow rate. It is when using this method for determining the flow rate known to use a device consisting of two signal generators positioned at a distance from each other in the direction of the fluid flow, the signals being sent from each of the signal generators against the other signal generator, the signal generators being switched over to signal receivers before the transmitted pulse shaped signals arrive to the signal generators. As the speeds of the signals in the fluid are different at different fluids and also in one and the same fluid if this has different pressures and temperatures the dwell time of the pulse shaped oscillating signals in the fluid will be different which causes that the phase shift between the signals is different even if the flow rates of the fluids are the same. This is of course a great disadvantage of the previously known method for determining the fluid rate as the determination is thereby less exact.

In another previously known method for determining the flow rate of a fluid flowing in a channel there is sent a pulse shaped, oscillating signal from a first point to a second point which points are positioned at a distance from each other in the direction of flow, whereupon the signal arriving to the second point is digitized and the digitized representation of the signal is registered in an electronic memory. There upon a pulse shaped, oscillating signal is sent in the opposite direction, i.e. from the second to the first point, whereupon the signal is in the same way digitized and registered in the electronic memory. Because of the fact that one signal moves with the flow and the other signal moves against the flow in the fluid there is provided a phase shift between the signals, and this phase shift is used for determining the flow rate.

In this previously known method it is a drawback that the signals are not sent and received at the same time which provides that a temporary variation in the flow rate will have an influence on the determination of the flow rate. A further drawback is that extremely expensive circuits are required for conducting this method.

BRIEF SUMMARY OF THE INVENTION

The object of the invention is to provide a method and a device for determining the flow rate of a fluid flowing in a channel, which obviates the lacking exactness in the methods described above and makes it possible to use less expensive circuits for conducting the different functions.

In order to comply with this object the method according to the invention is characterized in that the determination of the phase shift between the signals is conducted while compensating for the dwell time of the pulse shaped oscillating signals in the fluid. Thus, the phase shift between the signals is corrected with regard to the speed of the signals in the fluid so that the phase shift which is utilized for the determination of the fluid rate is constituted by the phase shift between the signals present at one and the same dwell time for the signals in the fluid.

It is in the method according to the invention preferred that the two pulse shaped oscillating signals are concurrently sent from one signal generator each, the signal generators being positioned at a distance from each other in the direction of flow of the fluid, towards one signal receiver each, wherein it is suitable to use signal generators which can be switched over to signal receivers. Thereby, the two pulse shaped oscillating signals are sent from each of the signal generators towards the other signal generator and the signal generators are switched over to signal receivers before the transmitted pulse shaped signals arrive thereto.

In the method according to the invention it is preferred that the signals are sent and received at different sides of the channel and that the determination of the phase shift between the signals is conducted under compensation also for the angle between the direction of movement of the signals and the direction of flow of the fluid.

It is suitable that each of the signal generators is supplied with a sinusoidal, pulse shaped voltage which by means of the signal generators is converted into an ultrasonic signal which is through the flowing fluid supplied to the signal receiver and is thereby converted into a sinusoidal pulse shaped voltage. The sinusoidal, pulse shaped voltages from the signal receivers are supplied to an analogue phase detector for determining the phase shift between the sinusoidal pulse shaped voltages. Thereby the channel for the flowing fluid can be constituted by a pipe which consists of a material allowing the ultrasonics to pass without too much damping or abduction. However, the pipe walls should consist of a relatively homogenous material which provides for better and cleaner signals. I order to avoid the problems which can appear when the ultrasonic passes the pipe walls it is possible also to position the signal generators inside the pipe.

The invention comprises also a device for conducting the method.

BRIEF DESCRIPTION OF THE SEVERAL VIEWS OF THE DRAWINGS

The invention shall in the following be described with reference to the accompanying drawings.

DETAILED DESCRIPTION OF THE INVENTION

Figure 1:
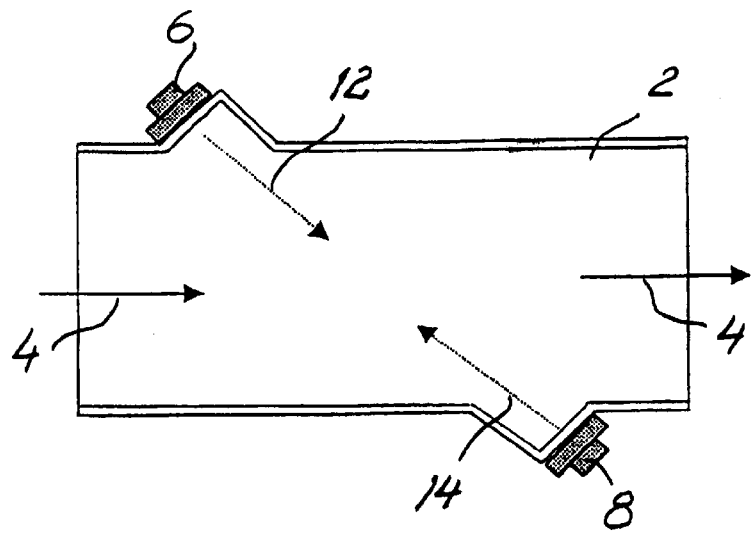
FIG. 1 is a schematic representation showing a device according to the invention illustrating the principles constituting the basic idea of the invention.
Figure 1:
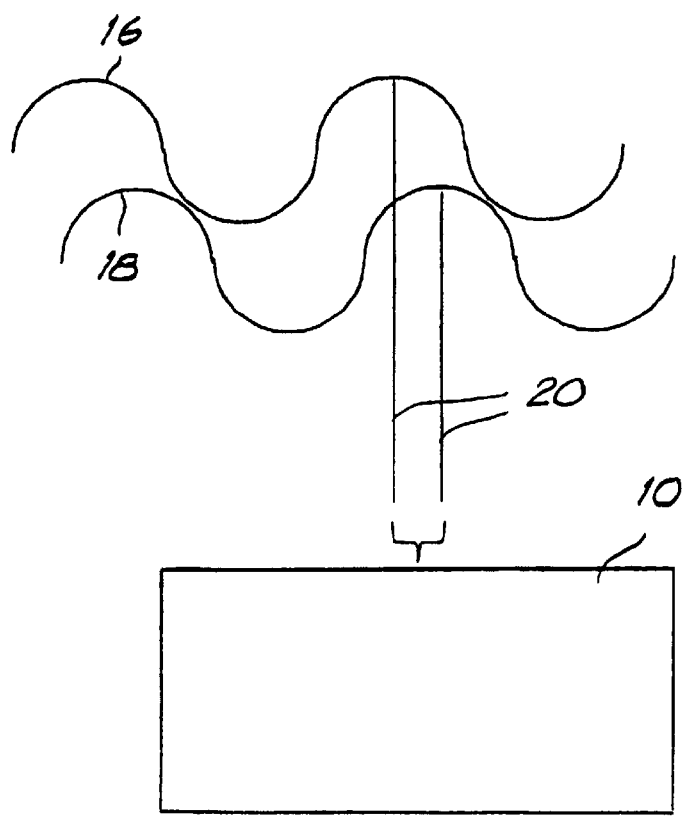

The device schematically shown in FIG. 1 is intended for determining the flow rate of a fluid, for example a liquid, flowing through a pipe 2 in the direction of the arrows 4. The device comprises two sensor units 6 and 8 connected with the pipe 2 and an electronic computer unit 10. The sensor units 6 and 8 are constituted by switchable transmitters/receivers for ultrasonics and are positioned at opposite sides of the pipe 2 at a distance from each other in the longitudinal direction of the pipe and adjusted so that ultrasonics transmitted from one of the sensor units 6 or 8 hit the other sensor unit 8 or 6. The sensor units 6 and 8 are during a predetermining time and concurrently supplied with a sinusoidal voltage pulse. The voltage pulses are in the sensor units transformed into one ultrasonic pulse by means of piezoelectric elements positioned in the sensor units. The ultrasonic pulse created in the sensor unit 6 leaves the sensor unit in the direction shown by means of the arrow 12 towards the sensor unit 8, at the same time as the ultrasonic pulse created by the sensor unit 8 leaves the sensor unit 8 in the direction shown by means of the arrow 14 towards the sensor unit 6. When the ultrasonic pulses have left the sensor units 6 and 8 these are switched over to receiving positions so that the sensor unit 6 can receive the ultrasonic pulse from the sensor unit 8 and the sensor unit 8 can receive the ultrasonic pulse from the sensor unit 6, when the ultrasonic pulses arrive to the sensor units 6 and 8, respectively. When the ultrasonic pulses arrive to the sensor units 6 and 8 they are transformed to sinusoidal voltage pulses by means of the piezo-electric elements arranged in the sensor units, and these voltage pulses are transferred to the electronic unit 10.

It is realized that the two ultrasonic pulses which are transmitted through the fluid flowing through the pipe 2 move with the same speed in relation to the flowing fluid. This speed is defined by the speed at which said fluid transmits sound at existing conditions with regard to temperature and pressure. It is realized also that the ultrasonic pulses will be transmitted with different speeds in relation to the sensor units 6 and 8, as the ultrasonic pulses from the sensor unit 6 move with the flow direction of the fluid while the ultrasonic pulses from the sensor unit 8 move against the flow direction of the fluid. This difference in the speeds of the ultrasonic pulses in relation to the sensor units provides that the ultrasonic pulse leaving the sensor unit 6 will reach the sensor unit 8 before the ultrasonic pulse leaving the sensor unit 8 will reach the sensor unit B. This time difference is determined by the flow rate of the flowing medium but also by the speed of the ultrasonic pulse in the fluid and the angle of the ultrasonic pulses in relation to the flow direction of the fluid. The time difference at which the ultrasonic pulses arrive to the sensor units 6 and 8 provides for a phase shift between the two sinusoidal voltage pulses created by the piezo-electric crystals in the sensor units 6 and 8. Thus, the sinusoidal voltage pulses 16 and 18 which are schematically shown in FIG. 1 will present a phase shift 20, which as mentioned above is mainly determined by the flow rate of the fluid in the pipe 2 but it is also influenced by the speed of the ultrasonic pulses in the medium and the direction of movement of the ultrasonic pulses in relation to the flow direction of the flowing fluid.

The electronic unit 10 records the time which it takes for the ultrasonic pulse to move from the sensor unit 6 to the sensor unit 8, the phase shift 20 being in the electronic unit 10 corrected with regard to different ultrasonic speeds in the medium flowing through the pipe 2. Subsequently to the correction the sinusoidal voltage pulses are transmitted to an analogous phase detector in which the phase shift between the pulses is determined. It is thereby also considered what frequency has been used, and the result is used for defining with high accuracy the time difference between the voltage pulses and thereby the flow rate of the fluid in the pipe 2. When defining the sound speed in the fluid the above time which it takes for the ultrasonic signals to pass between the sensor units 6 and 8 is related to the passed way, i.e. the size of the inner diameter of the pipe and the angle of the signal direction in relation to the flow direction of the flowing fluid.

Thus, the calculations conducted in the electronic unit 10 are as follows:

a) the speeds of the ultrasonic signals in the fluid are determined by relating the time taken for the ultrasonic signals to pass from the sensor unit 6 to the sensor unit 8 to the inner diameter of the pipe 2 and the angle of the signal direction in relation to the direction of movement of the fluid, b) the phase shifts of the signals are determined and are related to the frequency used so as to provide for the same output signal irrespectively of the frequency which has been used, and c) the determined phase shift is related to the existing sound speed so as to provide for the same output signal irrespectively of the speed of the sound in the fluid, whereupon the last mentioned output signal can be directly utilized for defining the flow rate of the fluid in the pipe 2.

Example 1

When using the device according to FIG. 1 and at the following values of the inner diameter of the pipe, the angle between the transmission direction of the ultrasonic signals and the flow direction of the fluid, the frequency of the signals and the phase shift the following calculations give the value of the flow rate of the fluid.

| | |
|---|---|
| Inner diameter of the pipe | 200 |
| Angle | 20° |
| Frequency | 2 MHz |
| Fluid | Water, sound velocity 1390 m/sec |
| Time unit | Nanosec |
| Digital resolution, phase shift | 1024 bites |
| Digital resolution, time for the signal in the pipe | 200 ns (for calculating the sound velocity in the fluid) |

| Measurement of phase shift | | | |
|---|---|---|---|
| | Flow rate 0 m/sec | Flow rate 1 m/sec | Flow rate 6 m/sec |
| Time from A-B | 200/sin20/1390− −0*cos20 = 153119ns | 200/sin20/1390− −1*cos20 = 153156ns | 200/sin20/1390− −6*cos20 = 153345ns |
| Time from B-A | 200/sin20/1390+ +0*cos20 = 153119ns | 200/sin20/1390+ +1*cos20 = 153081ns | 200/sin20/1390+ +6*cos20 = 152893ns |

-continued

| | |
|---|---|
| Inner diameter of the pipe | 200 |
| Angle | 20° |
| Frequency | 2 MHz |
| Fluid | Water, sound velocity 1390 m/sec |
| Time unit | Nanosec |
| Digital resolution, phase shift | 1024 bites |
| Digital resolution, time for the signal in the pipe | 200 ns (for calculating the sound velocity in the fluid) |

Measurement of phase shift

| | Flow rate 0 m/sec | Flow rate 1 m/sec | Flow rate 6 m/sec |
|---|---|---|---|
| Difference A-B | 0 | 75 | 452 |
| Phase shift | 0 degrees | 27.12 degrees | 162.76 degrees |
| Digital resolution | 0 | 154 | 926 |

Comments: The digital reading of the analogous measurement of the phase shift means that the method gives by means of very simple means a time resolution of about a half nanosecond in this example.

Measurement of the sound velocity in the fluid:

(Minimal influence if up-stream or down-stream is selected therefor)

| | | | |
|---|---|---|---|
| Time from A–B (same as above) | 153119 ns | 153156 ns | 153345 ns |
| Clock cycles | 765 | 765 | 766 |

Comments: The proportionately long time which it takes for the signal to pass the fluid in relation to the changes of this time caused by the influence from the flow means that it is in practice possible to disregard the influence of the flow at this measurement. In this example there is provided for an accuracy of 765 steps for a sound velocity in the fluid of 1390, i.e. a resolution of 1390/765=1.8 m/sec. 1.8 m/sec divided by the sound velocity 1390 gives a maximum error of 0.12%.

Example 2

Preferences: Same as above but with a change of the sound velocity in the fluid (for example caused by a change of temperature). Fluid: Water, sound velocity 1430 m/sec.

Measurement of phase shift:

| | Flow rate 0 m/sec | Flow rate 1 m/sec | Flow rate 6 m/sec |
|---|---|---|---|
| Time from A–B | 148836 ns | 148871 ns | 149049 ns |
| Time from B–A | 148836 ns | 148800 ns | 148622 ns |
| Difference A–B | 0 ns | 71 ns | 427 ns |
| Phase shift | 0 degrees | 25.63 degrees | 157.78 degrees |
| Digital resolution | 0 | 145 | 897 |

Measurement of the sound velocity in the fluid

| | | | |
|---|---|---|---|
| Time from A–B (same as above) | 148836 ns | 148871 ns | 149049 ns |
| Clock cycles | 744 | 744 | 745 |

The digital values given in the two examples mentioned above can by being related to the used angle and the used frequency in a simple way be converted to the real values of time differences and sound velocities. This does in turn give the flow rate in the fluid irrespectively of the sound velocity existing in the fluid and the used frequency.

Figure 2:
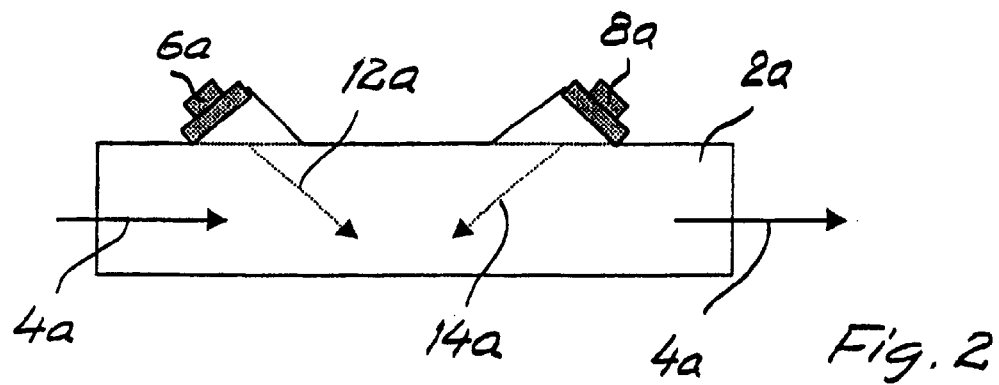
FIGS. 2, 3 and 4 are schematic representations of alternative devices according to the invention.
Figure 3:
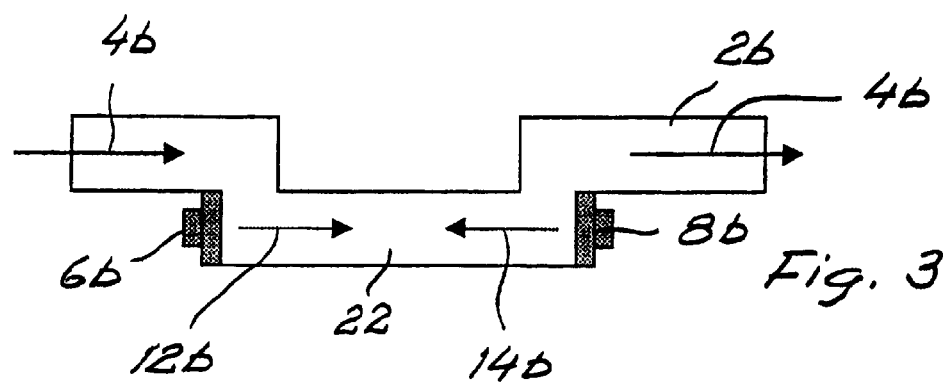
Figure 4:
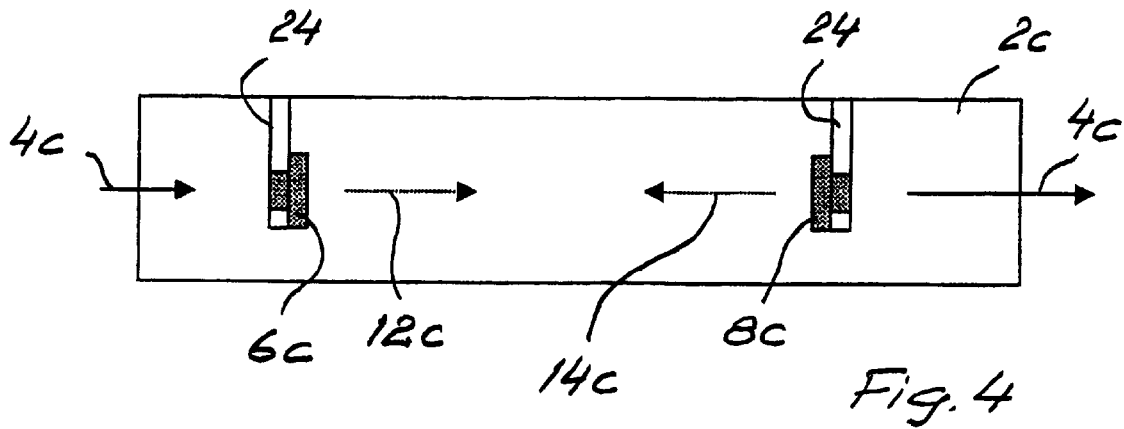

In FIGS. 2, 3 and 4 there are shown alternative ways of connecting sensor units to a pipe through which the fluid flows.

In FIG. 2 there is shown a pipe 2a through which the fluid flows in the direction of the arrows 4a. Two sensor units 6a and 8a of the same kind as the sensor units 6 and 8 according to FIG. 1 are positioned at the same side of the pipe. The sensor units 6a and 8a create in the same way as the sensor units according to FIG. 1 ultrasonic pulses which are sent in the directions 12a and 14a. The ultrasonic pulses bounce against the wall of the pipe 2a opposite to the sensor units 6a and 8a in such a way that the ultrasonic pulse sent by the sensor unit 6a arrives to the sensor unit 8a and the ultrasonic pulse sent by the sensor unit Ba arrives to the sensor unit 6a. The sensor units 6a and 8a are in the same way as the sensor units according to FIG. 1 switchable between transmission and reception.

The fluid flows through the pipe 2b shown in FIG. 3 in the direction of the arrows 4b and the pipe has a large, U-shaped portion 22. In this embodiment the sensor units 6b and 8b are arranged at the ends of the web portion of the U-shaped element 22 of the pipe 2b in such a way that the ultrasonic signals sent from the sensor units 6b and 8b have a direction which is shown same as the flow direction of the fluid. Thus, in this embodiment there is not required any compensation for angular deviations between the ultrasonic signals and the flow direction of the fluid.

In the embodiment shown in FIG. 4 the fluid flows through the pipe 2c in the direction of the arrows 4c, and the sensor units 6c and 8c are centrally supported in the pipe by means of radially extending retainers 24. As in the embodiment according to FIG. 3 the ultrasonic signals are transmitted from the sensor units 6c and 8c in directions shown by means of the arrows 12c and 14c and parallel with the flow direction of the fluid. In this embodiment there is not either required any compensation for angular deviation between the direction of the ultrasonic signals and the flow direction of the fluid but only a compensation for the dwell time of the ultrasonic signals in the fluid, i.e. different sound velocities of the ultrasonics in the fluid.

Figure 5:
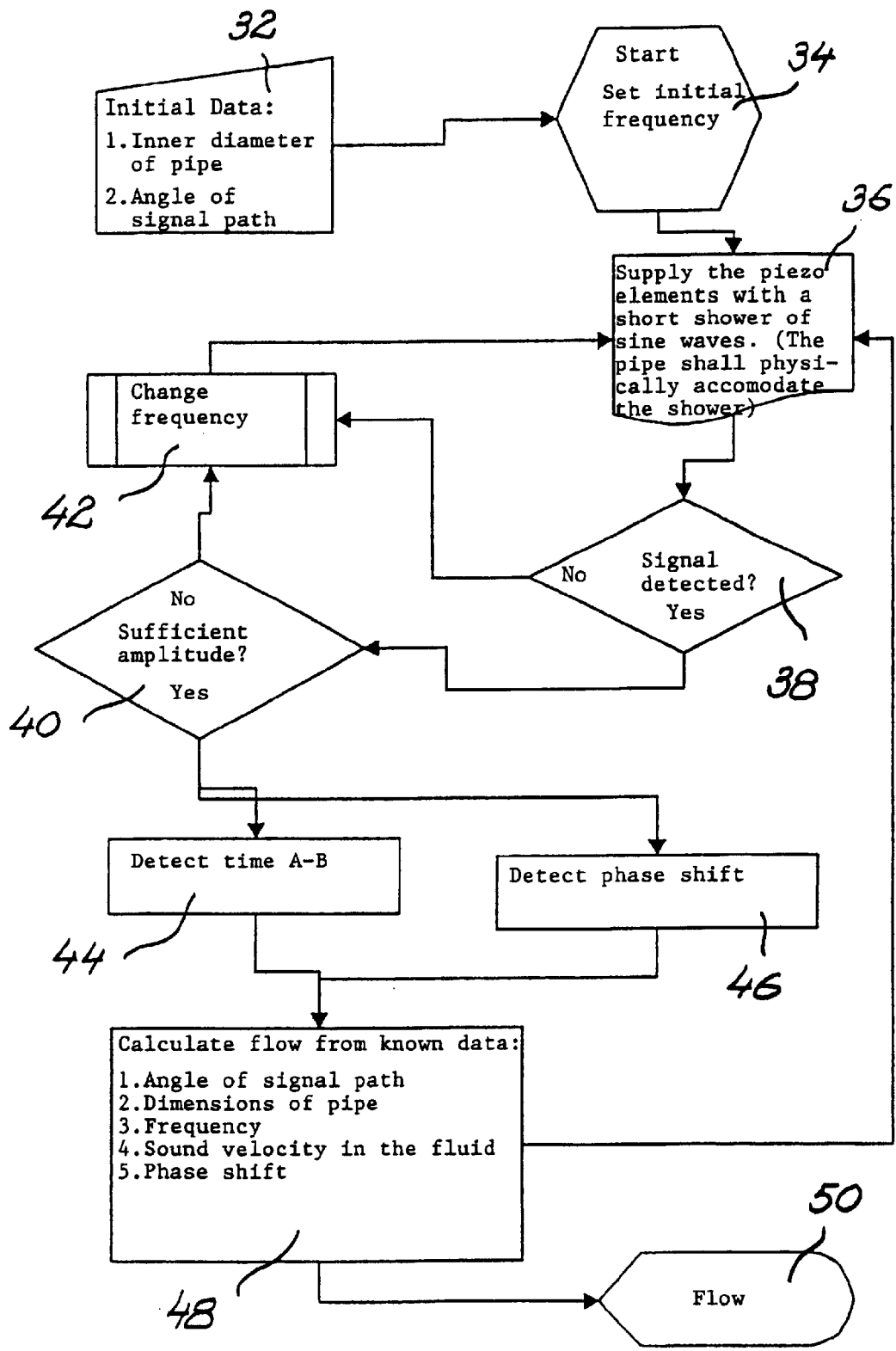
FIG. 5 shows the method and the device according to the invention in the form of a logic circuit.

FIG. 5 illustrates the method and the device according to the invention in the form of a block diagram.

The block 32 defines the non-variable quantities of the device according to the invention, viz. the inner diameter of the pipe through which the fluid flows and the angle between the ultrasonic signals and the flow direction of the fluid.

Block 34 defines the start of the device including the adjustment of the frequency of the sinusoidal voltage pulses transmitted to the sensor units. The sensor units transmit as a consequence thereof their ultrasonic pulses in the fluid whereupon the sensor units are switched to the receiving function. If the signals are received which is determined by the block 38 the information is further transmitted to the block 40. If the signals are not received by the sensor units the block 30 orders through the block 32 and adjustment of the frequency of the sinusoidal voltage pulses supplied to the sensor units until a correct reception takes place. In the block 40 is decided whether the amplitude of the ultrasonic signals is positioned above a lower limit value. If this is not the case there is provided for a feed back to the block 42 for providing a new adjustment of the frequency of the sinusoidal voltage pulses. If the value of the amplitude is above the lower limit value the blocks 44 and 46 are ordered to determine the dwell time of the ultrasonic pulses in the fluid and the phase shift between the sinus-shaped voltage pulses created by the ultrasonic pulses in the sensor units which have been switched to reception. The information from the blocks 44 and 46 is supplied to the block 48 which by means of received information, i.e.

1. the inner diameter of the pipe
2. the angle between the ultrasonic signals and the flow direction of the fluid
3. the frequency
4. the dwell time of the ultrasonic signals in the fluid (the velocity of the ultrasonic signals in the fluid)
5. the phase shift calculates the flow rate of the fluid in the pipe. The result given from the device is designated with the block 50.

Figure 6:
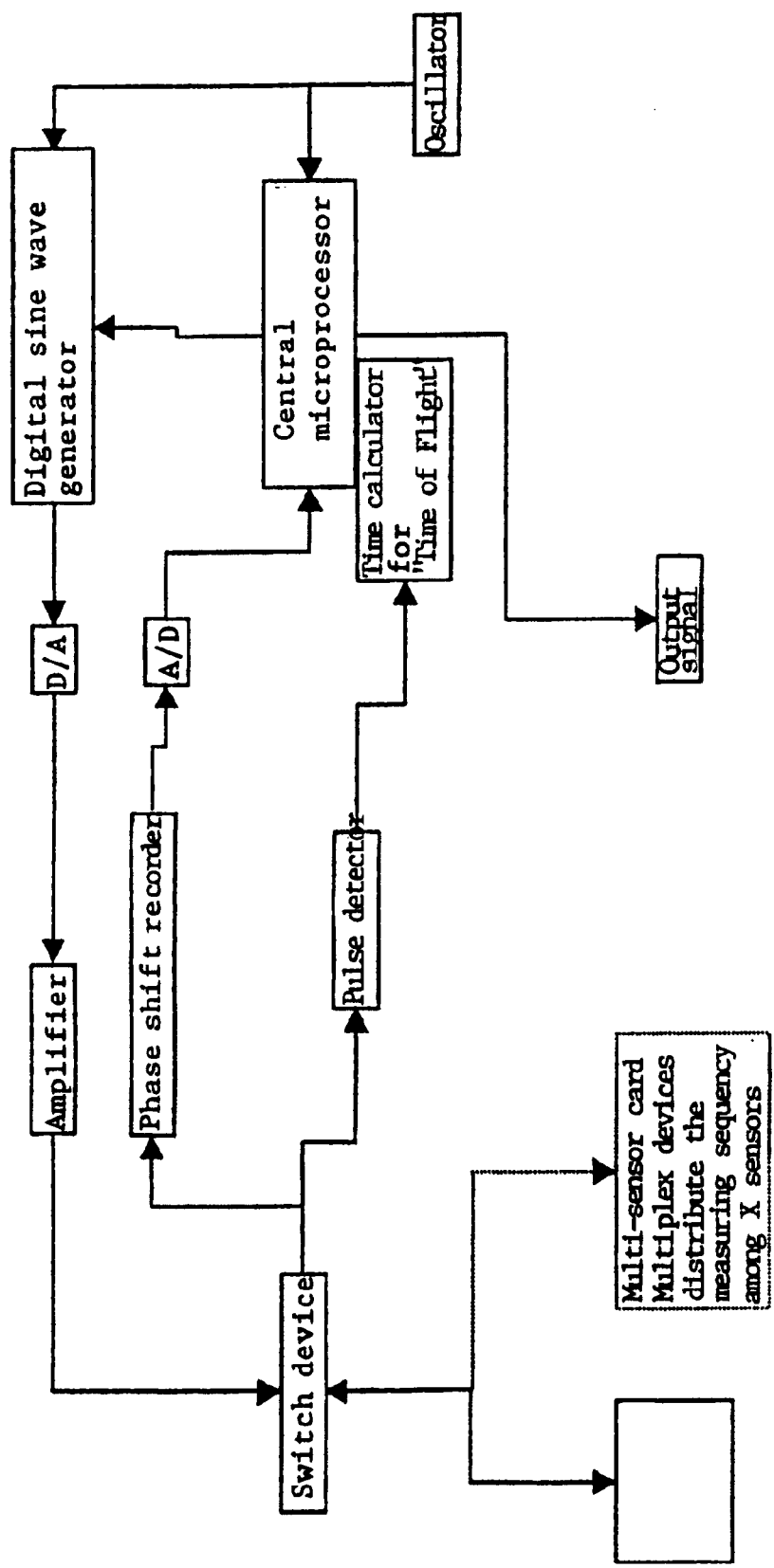
FIG. 6 illustrates in the form of a block diagram the electronic circuit included in the device according to the invention.

The electronic circuits included in the device according to the invention appears from FIG. 6.

The invention can be modified within the scope of the following claims.

What is claimed is:

1. A method for determining a flow rate of a fluid flowing in a channel, the fluid being constituted by a liquid or a gas, comprising the steps of:

sending from signal generators two pulse shaped, oscillating signals through the fluid at substantially the same time with one signal directed against a flow direction of the fluid and the other signal directed with the flow direction of the fluid;

receiving the two pulse shaped, oscillating signals;

switching the signal generators to signal receivers before the two pulse shaped, oscillating signals are received by the signal receivers, wherein the signal generators are positioned towards each other at a distance in the flow direction of the fluid;

determining a phase shift by instantaneous phase shift measurement between the two pulse shaped, oscillating signals caused by the flow of the fluid upon receiving;

measuring the dwell time of at least one of the two pulse shaped, oscillating signals; and determining the flow rate from the measured phase shift while compensating for the dwell time of the at least one of the two pulsed shaped, oscillating signals in the fluid.

2. The method as claimed in claim 1, wherein the steps of sending and receiving the two pulse shaped, oscillating signals takes place at opposite sides of the channel;

and the step of determining of the flow rate takes place compensates also for an angle between the direction of movement of the signals and the flow direction of the fluid.

3. The method as claimed in claim 1, further comprising supplying each of the signal generators with a sinusoidal pulse shaped voltage which is transferred into an ultrasonic signal which is supplied to the signal receiver through the flowing fluid and is by the signal receiver transferred into a sinusoidal, pulse shaped voltage.

4. The method as claimed in claim 3, further comprising transferring the sinusoidal, pulse shaped voltages from the signal receivers to an analog phase detector measuring the phase shift between the sinusoidal voltages.

5. The method as claimed in claim 4, further comprising adjusting the flow rate determined from the phase shift measured by the analog phase detector with regard to a utilized frequency of the sinusoidal voltages so as to provide the same output signal at one in the same flow rate independently of the utilized frequency.

6. The method as claimed in claim 5, further comprising adjusting the output signal with regard to a signal velocity present in the fluid for providing the output signal at one in the same flow rate independently of the signal velocity present in the fluid.

7. A device for determining a flow rate of a fluid flowing in a channel, comprising:

two signal generators for transmitting each of two pulse shaped, oscillating signals through the medium at substantially the same time, wherein one of the two pulse shaped, oscillating signals is directed against a flow direction of the fluid and the other of the two pulse shaped, oscillating signals is directed with the flow direction of the fluid, wherein the signal generators being positioned at a distance from each other in the flow direction of the fluid;

two signal receivers, wherein the signal generators being adapted to be switched to the signal receivers before the two pulse shaped, oscillating signals are received by the signal receivers;

means for instantaneously measuring a phase shift between the two pulse shaped, oscillating signals caused by the flow of the fluid; and means for compensating for the dwell time of at least one of the two pulse shaped, oscillating signals in the fluid when the flow rate is determined.

8. The method as claimed in claim 2, further comprising supplying each of the signal generators with a sinusoidal pulse shaped voltage which is transferred into an ultrasonic signal which is supplied to the signal receiver through the flowing fluid and is by the signal receiver transferred into a sinusoidal, pulse shaped voltage.

9. The method as claimed in claim 1, wherein the step of determining the flow rate of the fluid is calculated by a computer unit on the basis of at least the measured phase shift between the two pulse shaped, oscillating signals, and the dwell time of at least one the two pulse shaped, oscillating signals.

10. The method as claimed in claim 9, wherein the computer unit additionally calculates the flow rate of the flow rate of the fluid on the basis of an angle between the direction of movement of the two pulse shaped, oscillating signals and the flow direction of the fluid.

11. The method as claimed in claim 10, wherein the computer additionally calculates the flow rate of the fluid on the basis of the a frequency of the two pulse shaped, oscillating signals passed through the fluid.

12. The method as claimed in claim 9, wherein the computer additionally calculates the flow rate of the fluid on the basis of the a frequency of the two pulse shaped, oscillating signals passed through the fluid.

13. The device according to claim 7, wherein the means for compensating for the dwell time is a computer unit that calculates the speed of sound through the fluid.

14. The device according to claim 7, wherein the means for instantaneously measuring the phase is a phase shift detector.

15. The device according to claim 14, wherein the means for compensating for the dwell time is a computer unit that calculates the speed of sound through the fluid.

16. The device according to claim 14, wherein the phase detector is an analog phase detector.

17. The device according to claim 16, wherein the means for compensating for the dwell time is a computer unit that calculates the speed of sound through the fluid.

18. The device according to claim 16, further comprising a computer unit that calculates the flow of the fluid.

19. A device for measuring a flow rate of a fluid flowing within a channel comprising:

two signal generators, each transmitting a pulse shaped, oscillating signal through the fluid simultaneously, each of the signal generators being arranged such that one signal generator directs one of the two pulse shaped, oscillating signals against a flow direction of the fluid, and the other signal generator directs the other of the two pulse shaped, oscillating signals with the flow direction of the fluid, wherein the signal generators being positioned at a distance from each other in the flow direction of the fluid;

two signal receivers arranged to receive the signals from the generators, wherein the signal generators are adapted to be switched to the signal receivers before the signals are received by the signal receivers; and means for measuring the phase shift between the two pulse shaped, oscillating signals caused by the flow of the fluid; and calculating means for calculating the flow rate of the fluid on the basis of at least the measured phase shift between the two pulse shaped, oscillating signals and the dwell time of at least one of the two pulse shaped, oscillating signals.

20. The device according to claim 19, wherein the means for measuring the phase shift between the signal is an analog phase detector.

* * * * *